United States Patent [19]
Blomberg

[11] 3,942,719
[45] Mar. 9, 1976

[54] HEATER, ESPECIALLY FOR MOTOR-CARS
[76] Inventor: Folke Ivar Blomberg, Duvstigen 4, Lidingo, Sweden, S-181 40
[22] Filed: July 22, 1974
[21] Appl. No.: 490,690

[52] U.S. Cl. ............................. 237/12.3 C; 237/1 R
[51] Int. Cl.² .......................................... B60H 1/02
[58] Field of Search .......... 237/1 R, 12.3 C, 12.3 R, 237/12.3 A, 9 R, 9 A, 6

[56] References Cited
UNITED STATES PATENTS
| | | | |
|---|---|---|---|
| 2,153,108 | 4/1939 | Underwood | 237/9 A |
| 2,490,266 | 12/1949 | Harrison et al. | 237/9 |

FOREIGN PATENTS OR APPLICATIONS
| | | | |
|---|---|---|---|
| 333,102 | 8/1930 | United Kingdom | 60/676 |

Primary Examiner—William E. Wayner
Assistant Examiner—William E. Tapolcai, Jr.
Attorney, Agent, or Firm—Laff, Whitesel & Rockman

[57] ABSTRACT

Normally some car heaters may have an air and a water system or only a water system, which system or systems are heated by a heater burner. A battery is used for the supply of the required electric energy to the heater. According to the invention the heat quantity delivered to the water is at least partly removed therefrom as steam, which is delivered to a steam engine. In this motor, the heat energy of the steam is converted into mechanic energy, which is utilized to drive apparatus included in the heater, which apparatuses normally consume electric current and/or is utilized to charge the battery.

14 Claims, 13 Drawing Figures

HEATER, ESPECIALLY FOR MOTOR-CARS

This invention relates to heaters, e.g. car heaters, having a burner in which the heat source includes a flame.

Of such car heaters, there are many makes and types. The fuel for the flame is generally delivered from the ordinary fuel tank of the motor-car. However, gas in bottles may also be utilized. The most common type of heater sucks air from the passenger compartment, heats it, and returns it back into the compartment. Often this type of heater is combined with a heat exchanger for water, so that also the cooling water of the engine is also heated. There are also such car heaters which only heat the water in the cooling system of the car engine and the water in the ordinary heating system of the car. The water is then circulated by a water pump driven by the car heater. Thus, the heating of the passenger compartment is accomplished by means of the normal heating system and a fan included in this system. In the last mentioned type of car heaters the air does not circulate inside the passenger compartment. Instead fresh air is forced into this compartment, which displaces a corresponding quantity of air that must leave the passenger compartment through the ordinary fresh air outlet of the car or through other openings between the passenger compartment and the air outside.

All these heaters have a disadvantage in that they consume current from the car battery during the entire time that they are operated. It is true that the power required is small, about 25 W, but it is large enough to discharge a cold battery, if it is not entirely fresh and newly charged at the beginning of the heating period. Therefore, it often happens that the battery discharges so far that it is impossible to start the car, after that the heater has been in operation an hour or so.

The present invention has for its purpose an elimination of this disadvantage and even an improvement of the car heater so that, instead of consuming current from the battery, it charges it.

According to the invention, the heat delivered to the water is at least partly removed therefrom as steam, which is delivered to a steam engine. There it is converted into mechanic energy which drives apparatus included in the heater, which apparatus normally consumes electric current or the steam engine may be utilized to charge the battery.

The invention will become more apparent from a consideration of the following description taken in connection with the accompanying drawings, wherein.

Figure 1:
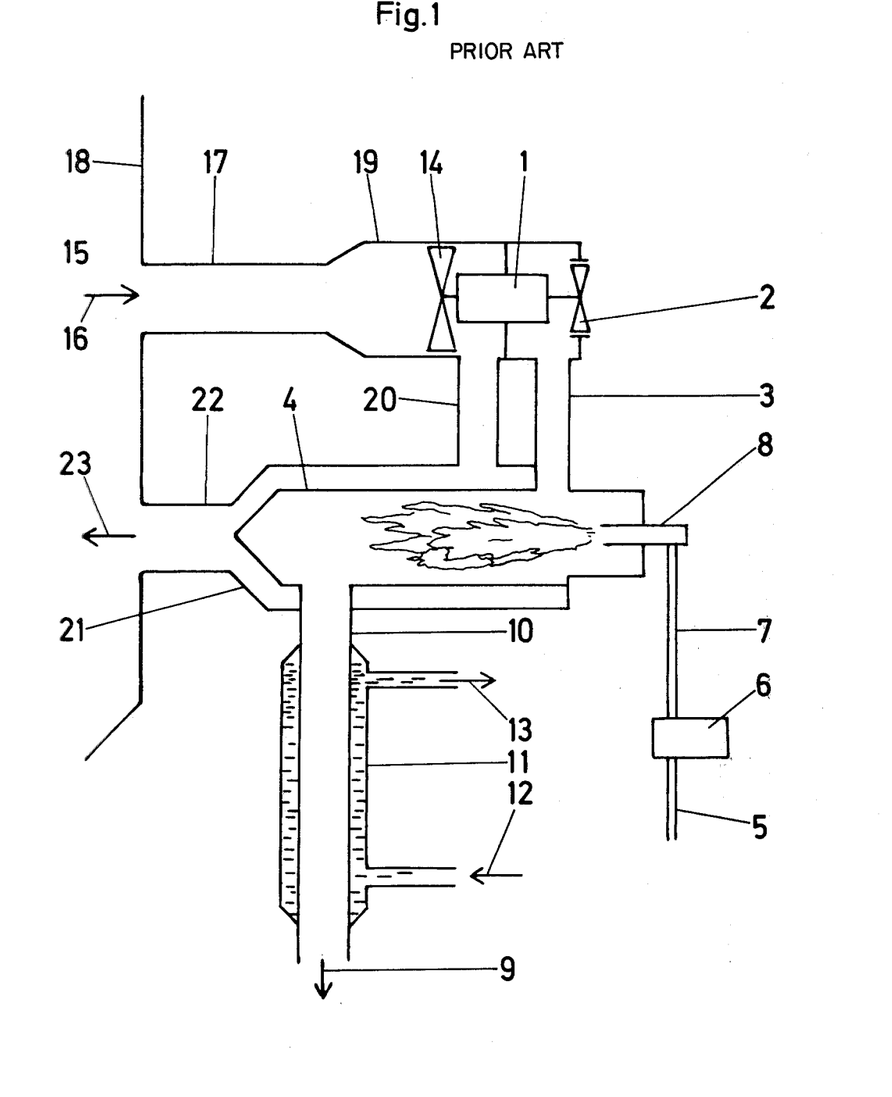
FIG. 1 shows schematically a car heater of a previously known type.

One of the more common type of known car heaters is shown in FIG. 1. An electric motor 1, which takes current from the ordinary car battery (not shown), drives a fan 2. This fan sucks air from the automobile engine compartment and forces it through a tube 3 and into a burner chamber 4. A fuel supply tube 5 is connected from the fuel tank of the car to an electric fuel pump 6, driven by the car battery. The fuel is transported from the pump 6 through a tube 7 and certain control means, known per se and therefore not described here, to a burner 8.

The combustion gases pass through the burner chamber 4 and leave the burner, as indicated by the arrow 9, through an exhaust tube 10, which is surrounded by a heat exchanger 11 connected to the cooling system of the car engine. The auto cooling water is heated in exchanger 11 and by means of a thermosiphon action circulating through the heat exchanger and the cooling system of the engine. The water entering into the heat exchanger 11 is indicated by the arrow 12 and leaving it by the arrow 13. The electric motor 1 also drives a fan 14, which sucks air from the passenger compartment 15, as is indicated by the arrow 16. The air passes through a tube 17, connected to an opening in the wall between the engine compartment and the passenger compartment. The air proceeds to the housing 19 of the fan 14 and is forced through a tube 20 and down into a heat exchanger casing 21 surrounding the burner chamber 4. From this heat exchanger casing, the heated air passes through the tube 22 and through an opening in the wall between the engine and passenger compartments, as indicated the arrow 23.

The device is includes an automatic starting system and a time switch which can be set to start the heater at a preselected time point. Thereafter, it is burning for a preselected time length, usually two hours.

There is no reason at all to describe this automatic control system here, as this system is not influenced by the additional devices, according to the present invention. In this control system are included a number of relays, thermostats and an ignition device comprising a glow spiral or an electric arc device.

When the heater is started manually or automatically by the time switch, the first step is that the ignition device is switched on and the fan motor 1 starts. When the ignition device operates, the fuel pump is started and the combustion begins. If the ignition device comprises a glow spiral it will take about a minute before it has arrived to at such a temperature that the injected fuel will be ignited. The glow spiral requires a power of about 250 W, which will be a rather severe shocklike load on the battery. Ignition systems of the arc type require considerably less current and are in general, after the burner has been started, practically immediately prepared to ignite the fuel.

Figure 2:
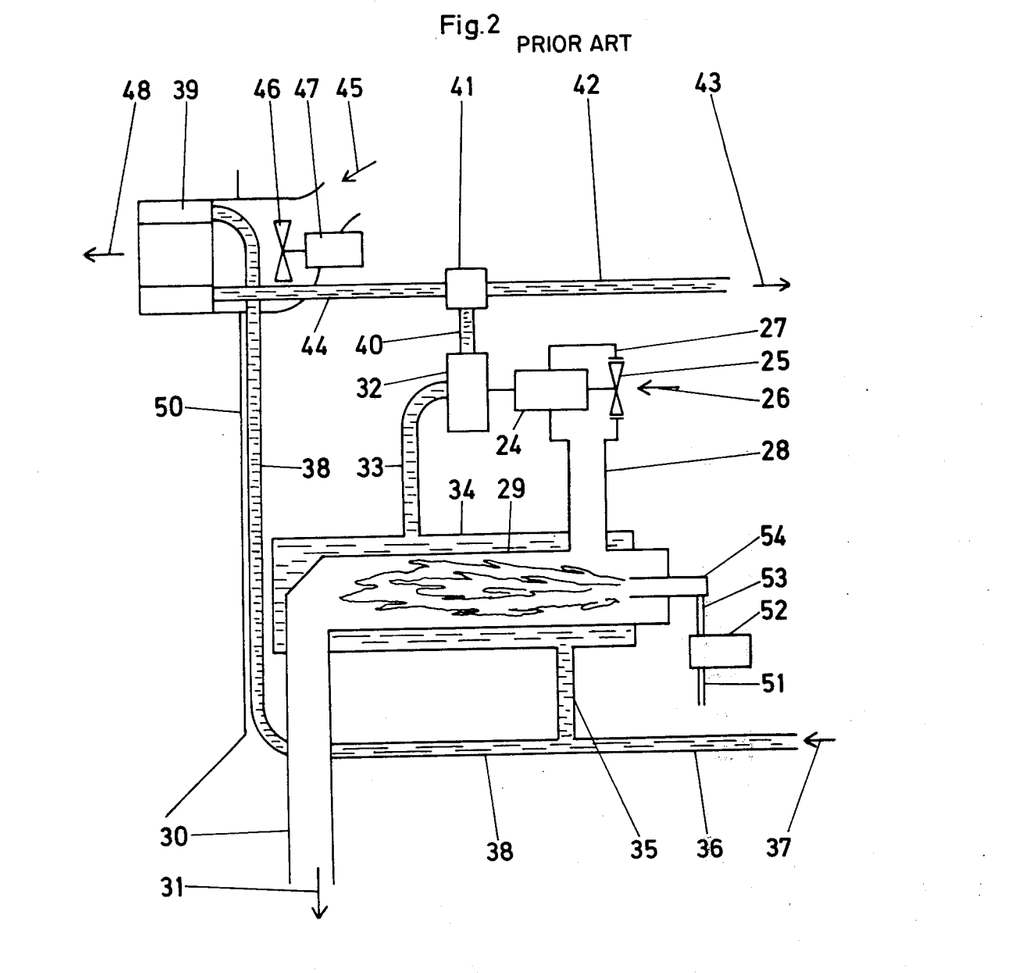
FIG. 2 shows schematically a car heater of another known type.

Another often used heater is shown in FIG. 2. It heats only the water circulating in the cooling system of the engine and in the heat exchanger included in the ordinary heating system of the car.

An electric motor 24 is supplied with current from the car battery which is used to drive a fan 25. At the arrow 26, the fan sucks air from the engine compartment and into a fan housing 27. The fan 25 forces the air further through a tube 28 and down into a burner chamber 29. The combustion gases leave the burner chamber through the exhaust gas tube 30 at the arrow 31.

The motor 24 drives a water pump 32, which draws heated water through a tube 33 from the space between the burner chamber 29 and a heat exchanger casing 34. The water to the heat exchanger is sucked through a tube 35, partly via a tube 36, from the cooling system of the car engine, as indicated by the arrow 37, and partly via a tube 38 from the heat exchanger 39 which is included in the ordinary car heating system. The pump 32 forces the water through a tube 40 to a distributor device 41, which can be adjusted to control how much of the circulating water shall pass via a tube 42 (at the arrow 43) through the cooling system of the car engine and how much of the water shall pass via a tube 44 through the heat exchanger 39. After being heated, the air shall be forced by the fan 46 into the passenger compartment 49, as at the arrow 45. The air is sucked from the outer air via the air inlets of the ordinary car heating system. This fan 46 and its drive motor 47 are included in the ordinary car heating system. The air is forced by the fan 46 through the heat exchanger 39 and into the passenger compartment, as at the arrow 48. The numeral 50 designates the wall between the engine and passenger compartments.

The fuel system, consisting of a tube 51 extending between the fuel tank of the car and an electric fuel pump 52, and a tube 53 extending between this pump and a burner chamber 54, is arranged in the same way as is described above in connection with the heater according to FIG. 1. The same applies generally also to the automatic starting and control system.

This type of heater differs from the one described in connection with FIG. 1. It is somewhat smaller and therefore easier to have room for in the engine compartment. It is also easier to install as it does not need the large diameter tubes 17 and 22 for the air heated in the heater, according to FIG. 1. The water tubings 38 and 44 have smaller diameters and these tubings do not cause any troubles when installing the heater. On the other hand the heater according to FIG. 2 requires more power than the heater according to FIG. 1, as the water pump 32 in FIG. 2 needs more power than the air fan 14 in FIG. 1. In addition to this also the motor 47 requires power.

Petrol-operated heaters usually consume about 0.6 liters/hour. Petrol has the density 0.72, thus meaning that the consumption is 0.43 kg petrol per hour. The heat value of petrol is about 10 000 kcal/kg, this giving a combustion energy of 4300 kcal/hour at complete combustion and if the heat energy is completely saved.

At a normal degree of efficiency of the combustion and a normal utilization of the heat power generated, it can be estimated that the heater effectively gives about 3000 kcal/hour, which corresponds to 3, 5 kW or 4, 75 HP.

A normal electric power consumption of a petrol-operated heater is 25 W, most of which operates the fan motor. An electric motor of this magnitude has a degree of efficiency of maximum 40%, which means that the mechanic energy which the two fans can utilize only is 40% of 25 W, i.e. 10 W.

If a device was possible which could convert heat energy into mechanic energy with a degree of efficiency of 100% the two fans should require only $10/3500 = 0.00286$, which means not quite three pro mille of the generated heat energy.

There are different ways to convert part of the generated heat energy into mechanic energy to drive the fans or to drive both the fans and a generator for charging the car battery.

It is also possible to use a thermoelement or a device with similar action to directly convert heat energy into electric energy, which then is utilized to supply the current to the fan motor or to both the fan motor and the battery charging.

As a basic principle for a device for converting heat energy into mechanic energy, it is possible to use a hot-air-engine of any kind, i.e. to utilize the condition that air expands when heated. The heater according to FIG. 1 and a modification of this does not use any water heating device. There are two air flows, which are heated, i.e. firstly the circulating passenger compartment air and secondly the combustion air. In the heater according to FIG. 2, there is only the combustion air flow. Of these two air flows, it is the circulating passenger compartment air which is easiest to utilize in this connection. It is, without any comparison, the largest air flow. In addition, it is supplied with the maximum part of the heat. It is further the question of moderate temperatures, about 100° C, and it is also clean. These two last conditions are essential when constructing a cheap hot-air-engine with good reliability and life.

Theoretically the hot-air-energy may be of the piston-engine type, but it is easier to build a turbine machine. When the turbine is arranged in the passenger compartment air flow according to the heater in FIG. 1, the turbine should be placed in the tube 22 and for instance be mechanically connected to the fan motor 1. The cool air is sucked through the tube 17, in which it has a certain velocity. When passing the heater, it will be heated thereby having its volume increased. Thus, the velocity in the tube 22, if this has the same diameter as the tube 17, will be higher than that existing in the latter tube. This increase of the velocity energy the turbine will convert into mechanic energy, which thus is transferred to the fan motor shaft. Hence, the turbine takes over the drive of the two fans through increasing the rotational speed of the fan motor so much, that the counter voltage of the fan motor will be equal to the battery voltage. The power requirement of the fan motor therefore will be zero. If the rotational speed of the fan motor is increased still more, the counter voltage will be higher than the battery voltage, and the battery is charged.

The principle is very much alike the one, according to which modern gas turbines and jet engines are working.

It is also possible to use a generator, which is driven by the turbine and thereby charges the battery by at least the current which the fan motor consumes. However, there will be a loss of efficiency in the generator, which is considerably larger than such a loss in the mechanic connection between the turbine and the fan motor, in addition to which there will be the complication of a generator.

It is, of course, possible to utilize the hot-air-engine principle also in the heater according to FIG. 2, the turbine thereby preferably being placed in the air outlet from the heat exchanger 39. Calculations and tests, however, have proved, that a hot-air-engine device should possibly fully compensate for the power requirement of the fan motor. However the chances of achieving this condition is not large, at least when using moderate devices. It is not at all possible to receive a reserve for charging a battery. To provide a reasonable degree of efficiency, a very fine turbine is required, having probably several steps, a high r.p.m. and a very exact form of the air channels in order to avoid flow losses as much as possible.

The present invention is based on quite other ideas. That is, it uses a regular, complete steam engine having a steam generator and a steam superheater, a steam engine, a feed pump, a liquid level control system and finally a device for the condensation of the exhaust steam. The whole equipment will be described in the following specification, but first I will give a brief statement of the energy balance.

The steam engine is preferably connected directly to the fan motor shaft. It has been mentioned before that an input power of 25 W for the fan motor corresponds to only 10 W shaft effect. If the steam engine has a shaft effect of 10 W, the power requirement of the fan motor is eliminated.

Suppose, then, that a charging effect of 25 W is wanted. Suppose further that the steam engine, as a generator, has the same degree of efficiency as it has as motor, which means 40%. The steam engine must then, for charging of 25 W, deliver a shaft effect of 25/0.4 = 62 W, which means that the total shaft effect of the steam engine must be 62 + 10 = 72 W, say 100 W. This effect is only 100/3000 = = 0.033, that is about 3% of the total heat power generated by an ordinary car heater.

It is quite obvious that it is here possible to use a steam engine equipment having a poor degree of efficiency. The engine can be designed for moderate steam pressures and a poor degree of expansion. It is also possible to allow large dead-volumes and a considerable leakage past the sealing elements of the steam engine. It does not matter if the exhaust steam contains large quantities of energy in relation to the supplied steam. The heat is not lost as it is returned to water, which in any case is heated.

The inventive device can be applied to all sorts of heaters, in which water is heated, for instance to heaters according to FIGS. 1 or 2 or modifications thereof.

Figure 3:
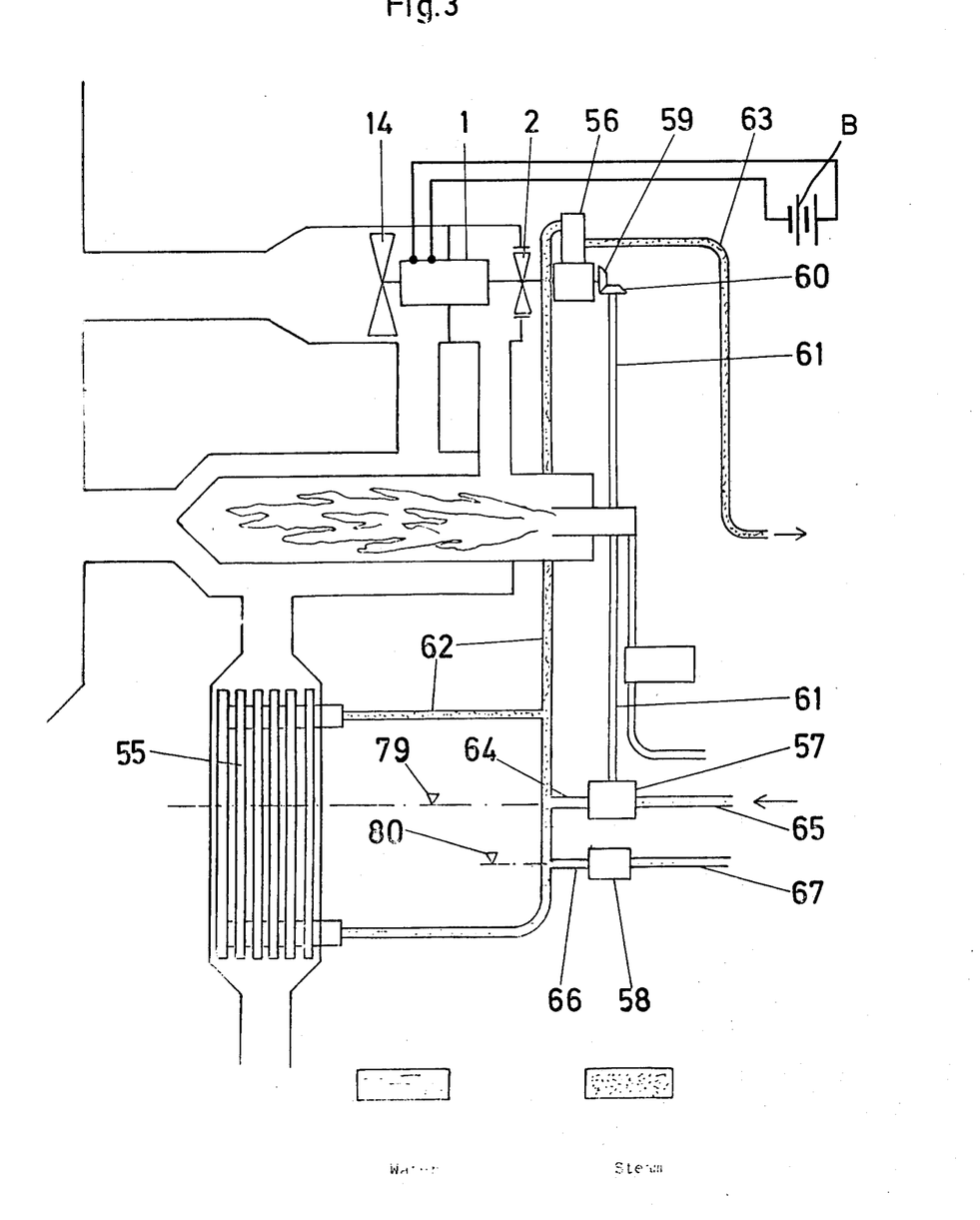
FIG. 3 is a longitudinal section of a car heater provided with the inventive device.

The invention is first described in connection with a heater according to FIG. 1. The inventive device is shown in FIG. 3, which corresponds to FIG. 1 with the exception that the simple heat exchanger 11 of FIG. 1 has been replaced by a flat heat exchanger 55 having a transfer surface which is considerably larger than that of the heat exchanger 11 of FIG. 1. FIG. 3 also shows the automobile battery B which powers the fan motor 1. Further there have been added a steam engine 56, a feed pump 57, a relief valve 58, a drive system between the steam engine 56 and the feed pump 57. The system consists of two bevel gears 59, 60 and a shaft 61. There are also tubes 62, 63, 64, 65, 66 and 67.

The steam engine 56 is directly connected to the fan motor 1. If the steam engine is "self-starting", that means that it can start from any angular position when supplied with overpressure. It is preferably connected to the fan motor 1 via a free wheel, so that the fan motor can run without the need of rotating the steam engine 56, when this, before the steam generation has started, is without pressure.

The system functions in the following way. The automatic starting process corresponds to the one according to FIG. 1. When the combustion has started the water in the heat exchanger 55 is heated. Steam is generated in the part of the heat exchanger which is above the water level 79 in FIG. 3. The part of the heat exchanger 55 above the water level 79 serves as steam superheater, which improves the degree of efficiency of the steam engine. The steam engine begins to operate, when there is a steam pressure generated, to assist the fan motor 1 in driving the two fans 2 and 14.

When the steam pressure has arrived at its full level, which is controlled by the preset position of the relief valve 58, the steam engine is giving the two fans 2, 14 and the motor 1 an r.p.m. which is higher than the normal r.p.m. of the motor, corresponding to the existing voltage of the electric system of the car. The motor 1 consumes no current from the car battery, but begins to charge it. The steam thus flows through the tube 62 to the steam engine 56, and from this through the tube 63 to the cooling system of the car engine, in which system the steam delivers its heat, and it is condensed. The steam engine 56 drives the feed pump 57 via the two bevel gears 59 and 60 and the shaft 61. Pump 57 sucks water from the cooling system of the car engine via tube 65 and forces it via the tube 64 into the heat exchanger 55. The pump 57 is described more in detail in the following. It is so designed that it automatically keeps the water at the level 79. That means that it cannot feed water above this level.

The heat exchanger 55 and the available heat energy of the combustion gases are so dimensioned, that more heat is supplied to the water than is necessary for the steam generation and the steam supply to the steam engine. This means that the steam pressure in the heat exchanger, at regular intervals, is increased over the value preset on the relief valve 58. This is then opened to let off hot water into the cooling system of the car engine, the water level thereby being lowered below the level 79. The feed pump 57, which has a capacity exceeding the quantity which shall be transformed into steam and then be supplied to the steam engine, begins to pump water into the heat exchanger. This water has a temperature corresponding to the temperature of the cooling water of the car engine. Thereby the temperature in the heat exchanger 55 is lowered and the pressure is lowered below the level preset on the relief valve 58. If the cooling effect given by the pumped water is not enough to lower the pressure to the required extent, which can happen at the end of a heating period when the water pumped by the feed pump 57 has arrived to rather high values, the water level is lowered to the level 80, so that steam blows off through the tube 66, the relief valve 58 and the tube 67 into the cooling system of the car engine, in which the steam is rapidly condensed.

The passenger compartment is heated in exactly the same way as is described in connection with FIG. 1. The water in the cooling system of the car engine is heated through condensation of exhaust steam from the steam engine 56, through hot water every time the pressure is increased above the preset value of the relief valve 58 and through steam (at the end of a heating period) blowing off into the cooling system of the car engine and is condensed there.

It has been mentioned here above that the installation of heaters for direct heating of the passenger compartment air, as for instance in the heater according to FIG. 1, is troublesome because of the large diameter tubes leading the air to and from the passenger compartment. Besides, in many cars, it is not so easy to find room for the large openings in the wall between the engine and passenger compartments. In some cases it is impossible to make these large openings without seriously reducing the strength of the car structure.

Under these premises, the heater of FIG. 2 has considerable advantages in relation to the heater of FIG. 1. The inventive device according to the present invention can therefore preferably be applied even to this type of heater. The disadvantage of which, until now, of having a still higher current consumption than the one of FIG. 1, dependent on the pump 32 and the "ordinary" fan motor 47, is eliminated thereby. The steam engine 56 enables a take-off of very large mechanic power, of which a part directly drives the pump 32 and a part is converted into electric power for driving the motor 47. It is also possible to use the steam motor to drive directly, for instance, via a flexible shaft and a free wheel, the fan 46 of the "ordinary" passenger compartment heater.

Principally, it is also possible to complete the device according to FIG. 2 by placing in the exhaust gas tube 30, a heat exchanger 55 and in connection there to use the feed pump 57, the relief valve 58 with associated tubes, the steam engine 56, the drive system 59, 60 and 61 for the feed pump; all taken from FIG. 3. The steam engine is thereby arranged to drive the fan 25, the motor 24 and the water pump 32 according to FIG. 2.

However, it is more realistic to utilize a heat exchanger system similar to that shown in FIG. 1, but which is given a heat transferring surface large enough to take all available heat from the combustion gases and not as in FIG. 1 only about ⅓ of the heat. In such a modification, the water pump 32 in FIG. 2 can be eliminated by giving the feed pump 57 such a large capacity that all the heat which is not utilized for generating the steam for the steam engine (about ⅔ of the whole heat quantity) passes the heat exchanger and is let out through the relief valve 58 according to FIG. 3. The tube from the relief valve 58 is then directly connected to the ordinary passenger compartment heater of the car. The water is circulating, driven by the steam pressure of the heat exchanger.

Figure 9:
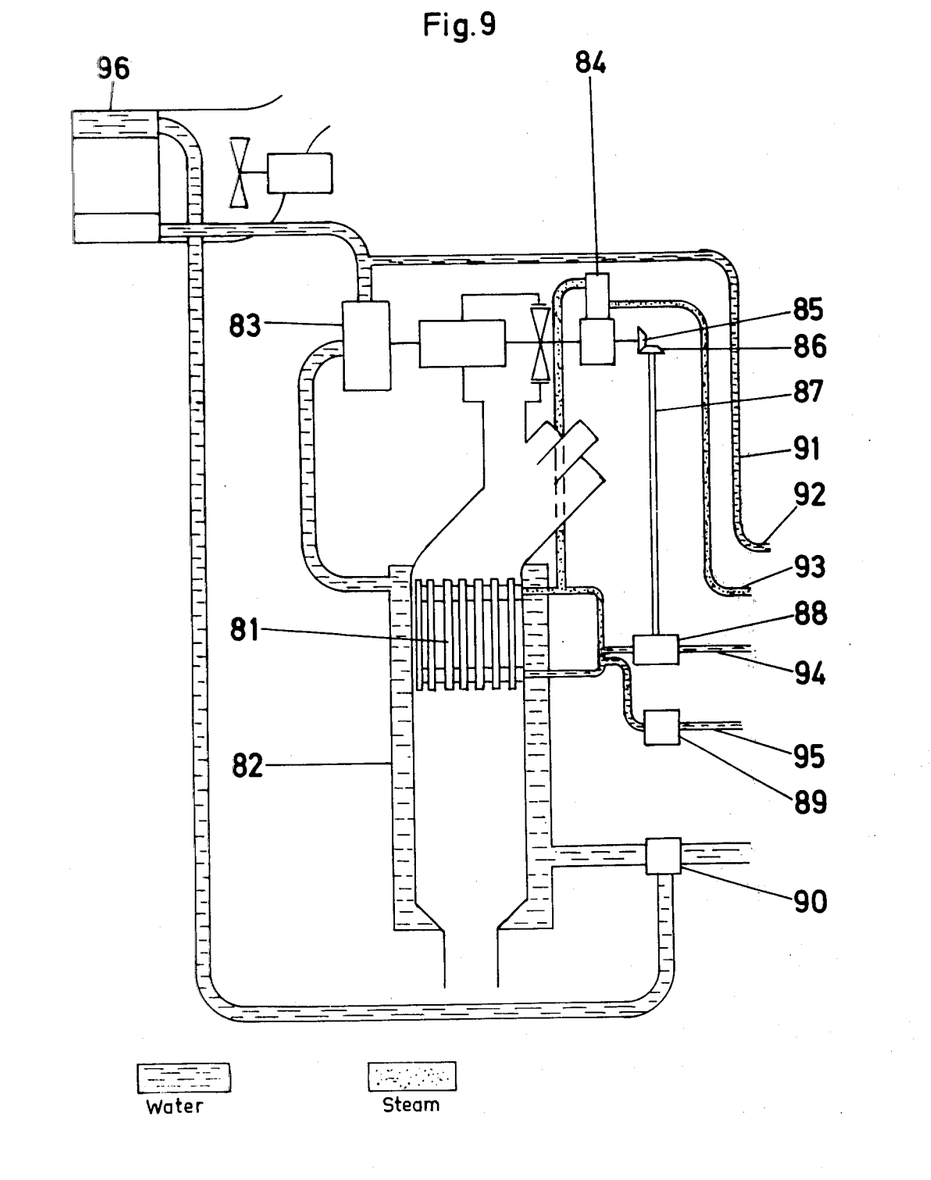
FIG. 9 shows schematically a modification of the device according to FIG. 3.

The cheapest solution, however, is shown in FIG. 9. Here two heat exchangers, joined together into a unit, are used. The flat heat exchanger 81 is the steam generator, which for two reasons can be made small. The first reason is that it is placed near the flame, where the temperature is high. The other reason is that the feed pump capacity can be made so small, that the water feed, with a very little reserve, is enough for the steam generation, which means that the relief valve is opened and returns hot water in a very little degree. Surrounding and below the heat exchanger 81 for generating the steam is a more simple heat exchanger 82, which is not under pressure and therefore can be made at low cost.

A water pump 88 is recognized from FIG. 2, where it is marked 32. The steam engine 84 and its drive system 85, 86, 87 to the feed pump 88 is recognized from FIG. 3 and also the relief valve 89 is similar to valve 58 in FIG. 3. The only new arrangement is the device 90, which can be a simple distributing valve for controlling the quantity of water circulating through the passenger compartment heater and the water passing through the engine block. It can also be a thermostatically controlled valve regulating this relation. When no water is circulating through the engine block, no water is passing through the tube 91. If the distributing valve is thermostatically controlled, it can for instance be so adjusted that at the beginning of a heating period no water is allowed to circulate through the engine block. Water first passes therethrough first when the water circulating through the passenger compartment heat exchanger 96 and the water heat exchanger 82 has arrived to a suitable temperature. The tubes 91, 92, 93, 94 and 95 can all be connected to the engine block, but also in this respect several modifications are possible. So, for instance, the steam outlet tube 92 can be connected to the water quantity circulating through the water heat exchanger 82 and the passenger compartment heat exchanger in order to rapidly raise its operating temperature. The water in the engine block is first heated very slowly. After that, when the distributing valve 90 is allowing water to be taken from the engine block, the water is heated more rapidly. It is also possible to have one or more separate heat exchangers replacing the ordinary passenger compartment heat exchanger of the car.

The apparatuses here above described are all intended to be provided with, for instance, permanent magnet motors. At all events, they are of such a nature that they and so also the steam engine and the two fans, before the steam pressure has been fully built up, are operated at a lower speed than when the full steam pressure and full charging exist during the continuous operation of the car heater.

With a very moderate complication, it is also possible to make such arrangements that the electric motor, even immediately after the start, is driven at full speed, for instance, through the use of a steam pressure regulated switch, which controls the field magnetization.

Figure 10:
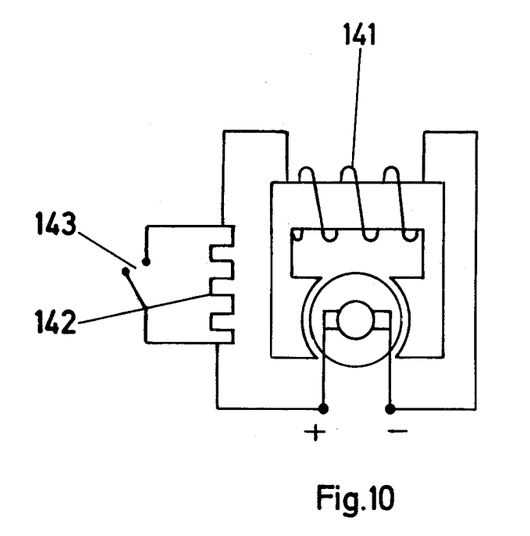
FIG. 10 is a device used in connection with an electric motor included in the car heater according to the invention.

In FIG. 10, is shown a shunt-conduction motor, in the field circuit 141 of which is inserted a resistance 142. When the steam pressure has arrived at a value of 80% of the full pressure, resistance 142 is short-circuited by means of a steam pressure guard 143. The field magnetization is increased and the relationship of the motor, between its terminal voltage and its rotational speed, is changed.

Figure 11:
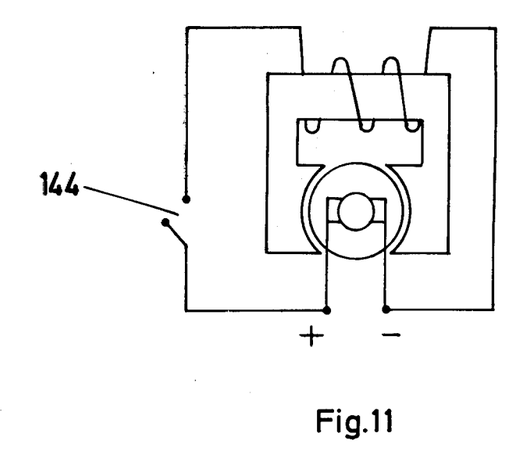
FIG. 11 is a modification of the device according to FIG. 10.

Another modification is shown in FIG. 11, which discloses a motor, the field magnets of which consist of permanent magnets and a coil, which magnifies the field, if current is through this coil. There is a steam pressure controlled switch 144, which, when the steam pressure has arrived to a value of 80% of the full value, connects the field coil to the plus pole of the motor.

In these ways, it is possible to achieve the same rotational speed of the motor immediately after start as when full steam pressure exists during the continuous operation of the car heater.

The speed variation during the start and until the full steam pressure and full charging has been arrived at may then for instance be the following.

It is supposed that the motor at normal battery voltage is capable of driving the steam motor and the two fans at 6000 r.p.m. Thus, the motor immediately after start is running at this rotational speed. Or, if the heater is provided with an energy requiring ignition device, for instance a glow spiral, the motor runs at a somewhat lower rotational speed, due to the potential drop caused by the current consumption of the ignition device. In all events, the rotational speed will be 6000 r.p.m., when the ignition device is shut-off by the automatic means.

As the steam pressure is increased, the rotational speed is also increased to more than the normal 6000 r.p.m. or perhaps is 6500 r.p.m. When 80% of the full steam pressure has arrived, the field magnetization of the motor suddenly is increased as described before. The rotational speed is then decreased to a value somewhat under 6000 r.p.m., for instance 5500. The current consumption of the motor now ceases, as the motor is driven at a rotational speed which gives a terminal voltage corresponding to that of the battery. When the steam pressure arrives to its full value, the rotational speed is again 6000 r.p.m., and the terminal voltage of the motor is exceeding that of the battery, which is charged.

It is also possible to completely control the rotational speed, so that it is maintained constant during all operation conditions. A simple method is to use a motor according to FIG. 10 or 11 and to have a switch controlled by the rotational speed for regulating the field magnetization. Such a switch controlled by the rotational speed is easily arranged in the form of a device on the motor shaft which is actuated by the centrifugal force and which flutters between open and closed position at the normal rotational speed.

If there is no requirement for the heater to charge the battery, it is enough that the heater consumes no current once it has been started. Then it is possible to make the device much cheaper.

It has been mentioned before that the energy consumption of the two fans is only about 10 W. Thus the shaft effect of the steam engine could be limited to 10 W, if it is sufficient that the heater takes no current once it has been started. It has also been mentioned that if the steam equipment should be dimensioned for a charging effect of 25 W then it is necessary to have a shaft effect of the steam engine of 100 W, i.e. 10 times larger. This shaft effect requires at a steam condition of 10 bar $-$ 250° C a heat exchanger transferring surface of ⅓ m$^2$.

At the same steam values a non-current consumption, but also non-charging car heater should require a heat exchanger transferring surface of only 1/30 m$^2$. This is possible to achieve by using a tube of 10 mm outer diameter and a length having just a little more than 1 m. Such a tube can be helically coiled to form a very small and cheap heat exchanger.

Further, the water consumption for this little device will be so small that it may be possible to dispense with the feed pump and, instead, at the beginning of a heating period to fill up all the water consumed during for instance two hours. A charging car heater consumes 1.3 liters of water per hour, which for a non-charging car heater would correspond to ¼ liter of water during two hours.

As there is no need of keeping the whole water volume at the temperature of the steam, the water tank is placed outside the space where the hot combustion gases pass.

The whole device is described in the following specification in connection with FIG. 12, which in turn emanates from the device according to FIG. 1.

Figure 12:
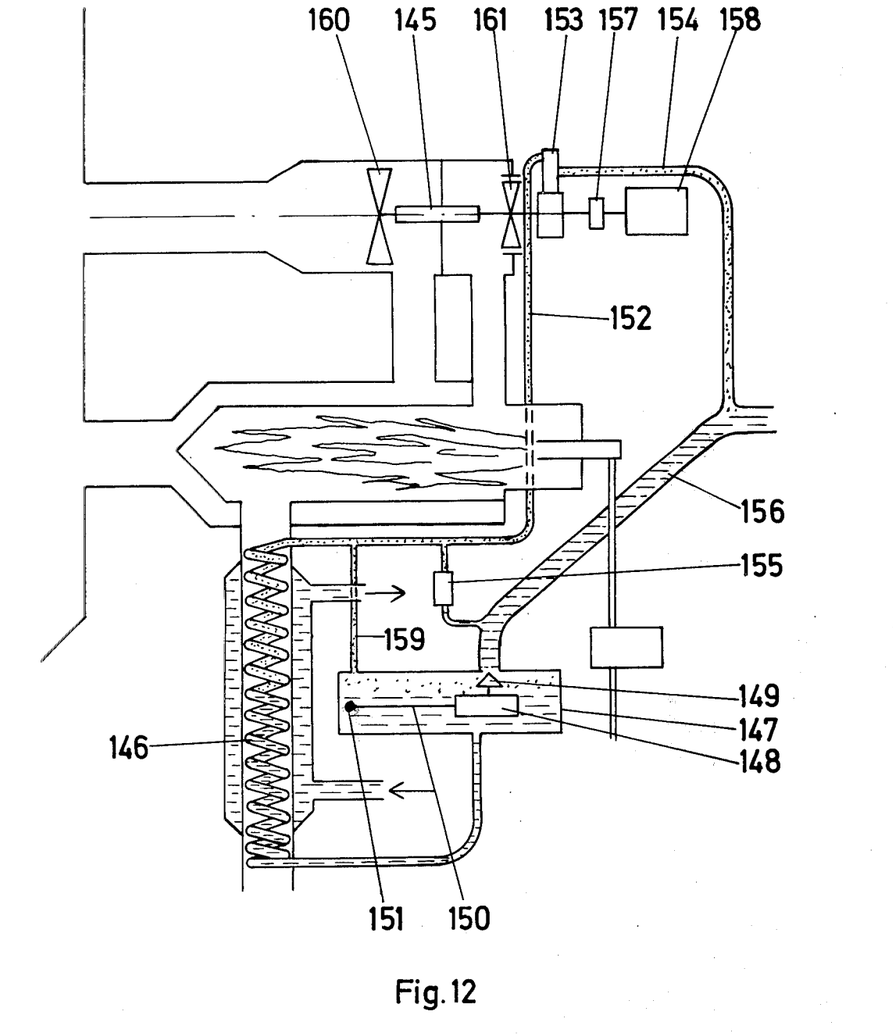
FIGS. 12 and 13 show schematically additional modifications of the device according to FIG. 3.

The motor 1 of FIG. 1 has in FIG. 12 been replaced by a simple bearing bracket 145 and the heat exchanger 11 of FIG. 1 has in FIG. 12 been provided with a coil 146.

A tube 156 is connected to the water cooling system of the car. Through this tube, water flows down into a tank 147 via a valve 149 connected to a float 148, mounted on an arm 150, which can turn about a shaft 151. When the water in the tank has arrived to a certain level, the water supply is shut off by the valve 149, in a well known way. The water level in the coil 146 will be adapted to the same level as that of the water tank 147, due to a vent pipe 159.

When starting the heater, an electromotor 158 drives a steam engine 153 and the two fans 160 and 161, via a free wheel 157. When the combustion has proceeded for a while, a steam pressure is generated in the coil 146 and of course also in the tank 147. The valve 149 is thereby effectively pressed against its seat, and the steam engine begins to assist the motor 158 in driving the fans 160 and 161. When the steam pressure has arrived at its full level, a switch (not shown) controlled by the steam pressure shuts off the current to the motor, which then stops. The steam engine alone takes over the drive of the two fans 160 and 161. The exhaust steam from the steam engine passes through a tube 154 and the tube 156 back to the cooling water system of the car, in which system it is condensed. Should the steam pressure arrive at a value exceeding that to which the relief valve 155 is adjusted, it opens and releases the steam, which in a way or another is returned to the cooling water system and is there condensed.

When the heater is stopped, the steam pressure successively is lowered to the outer air pressure or the pressure existing in the cooling water system, (which can be provided with a thrust cover). The valve 149 is opened for the water, which fills up the tank 147 to the level controlled by the float 148. The switch controlled by the steam pressure is closed again, and the heater is ready for the next operation period.

The system described here above, including the tank 147, the valve 149 etcetera, can of course be used also in the other car heaters described here above. In such cases, however, it will be the question of rather large water tanks, having a volume of about 3 liters. These will be rather bulky as they must be low, but wide, so that the water level in the heat exchanger will not vary too much during an operation period.

The steam engine included in the device will now be described. It is to be chosen over a dynamic motor, i.e. a turbine of any kind or a motor having enclosed volumes which vary with the shaft rotation. It is hardly possible to make a turbine of this magnitude, which has a reasonable degree of efficiency, unless very high rotational speeds are used. However, that speed should make the turbine too expensive. It is obvious that an engine having enclosed, varying volumes is the right solution and in this connection there are engines of many types to choose between. The ones nearest at hand is a piston engine or a wing motor. It is true, as mentioned before, that a motor having a poor degree of expansion can be used, but it is nevertheless necessary to have a degree of efficiency which is not too poor. A wing motor is tempting, but if such a motor shall have moderate dimensions it must be designed as a full pressure motor, i.e. the pressure of the steam must be as high, when it leaves the motor, as it is when supplied to it, giving a degree of efficiency which is too poor. All of these considerations indicate that a simple piston machine is the best solution.

Here below is described a very simple single-cylinder piston machine, which is well adapted to be used in connection with the present device. The engine is shown in two sections in FIGS. 5 and 6. The cylinder part 97 of the engine and its crankcase 98 are moulded in one piece. Into the cylinder part 97 is pressed a lining 99 of plastic. A crankshaft 100 is pivoted in two ball bearings 101 and 102, whch in turn are mounted in a bearing plate 103. The crankshaft 100 is fixed axially therethrough. The bearing 101 is axially fixed in the bearing plate 103 by means of two washers 104 and 105. The crankshaft 100 is axially fixed in the bearing 101 by means of a washer 106 mounted onto the crankshaft, a spacer 107 and the other ball bearing 102, which is in engagement with a shoulder formed on the crankshaft 100. In the lining 99 runs a piston 108, the lower part of which is designed principally in the same way as the piston of an ordinary car engine, but the upper part of which is provided with a tubular protrusion 109 having a series of holes 110. These holes 110 and the tubular protrusion 109 constitute, together with two series of further holes 111 and 112, the control system of the engine.

Figure 5:
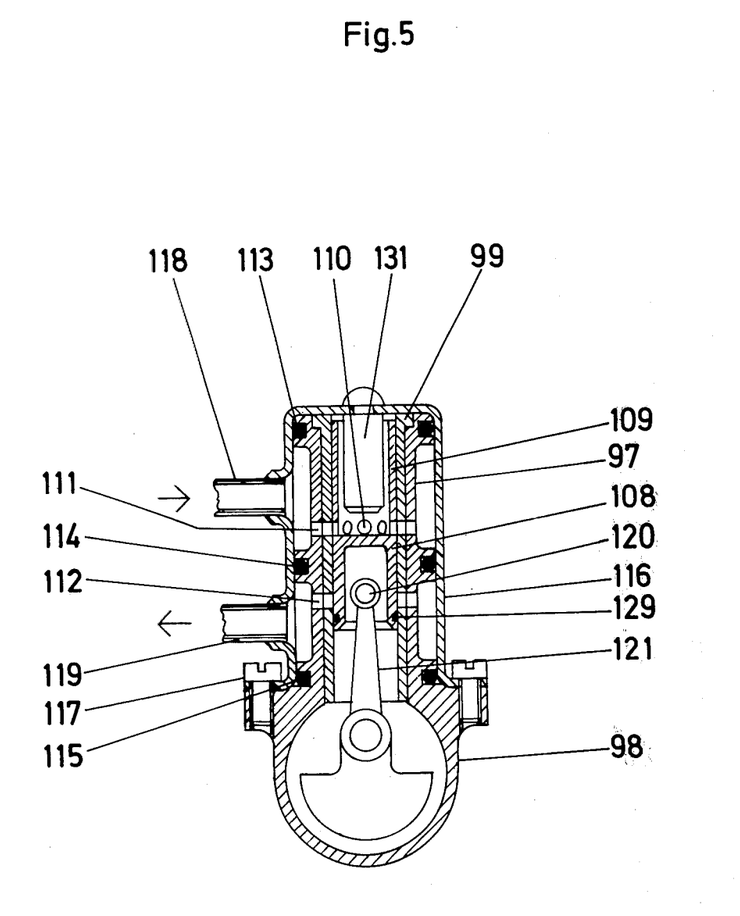
FIG. 5 is a cross section of a steam engine included in the inventive device.
Figure 6:
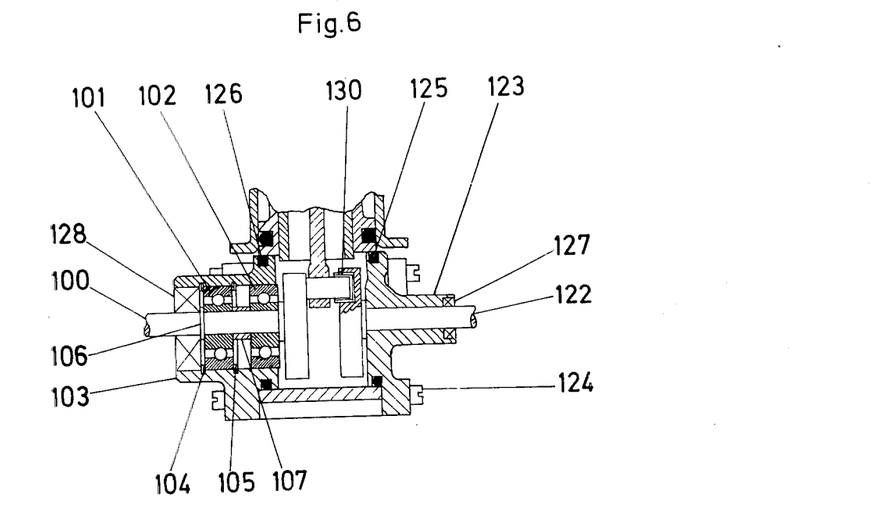
FIG. 6 is a longitudinal section of a portion of the same steam engine.

In the cylinder part 97, there are grooves for three O-rings 113, 114 and 115 which are sealing against a cylinder casing 116, this being fastened to the crankcase with screws 117. In the cylinder casing 116, there is inserted a fill-up member 131, the purpose of which is to reduce the large dead volume constituted by the tubular protrusion 109 of the piston 108. In the cylinder casing 116, there are made collared holes, in which a steam supply tube 118 and a steam exhaust tube 119 are soldered. In the piston 108 is inserted an ordinary piston bolt 120. About this bolt, a connecting rod 121 is pivoted. For the drive of the feed pump 57, there is a drive shaft 122, which is rotatably mounted in a slide bearing of a cover 123. This cover is, by means of screws 124, fastened to the crankcase 98. The drive shaft 122 is rotated by the piston bolt 120 of the crankshaft 100 via a rubber bushing 130. The O-rings 125 and 126 seal the cover 123 and the bearing plate 103 against the crankcase 98. Shaft sealing rings 127 and 128 seal the drive shaft 122 and the crankshaft 100.

The crankcase is filled up with oil to a certain level in order to lubricate the parts of the crank mechanism and also to some extent the lower part of the piston 108. However, substantially through the use of a appropriate plastic material for the lining 99, the piston 108 will function satisfactorily without any lubricating means other than the water, which appears when the steam condensates against the walls. In the lower end of the piston 108, there is an O-ring 129, which prevents oil from entering the cylinder and also prevents steam and condensed water from entering the crankcase 98. The crankcase is provided with a vent device not shown.

The piston 108 runs in the lining 99 with substantially no play. The thickness of the lining is selected on a criteria that the plastic material has a considerably larger coefficient of thermal expansion than the metal of the cylinder part 97 and of the piston 108. Therefore, the play between the piston 108 and the lining 99 will not be changed with temperature variations.

As the effect of the steam engine is not too high, the ball bearings 101 and 102, the slide bearings in both ends of the connecting rod 121 and in the cover 123, can all be produced from a plastic material. The slide bearings in the described embodiment have been machined directly in the metal material from which these details have been made. Again, water is all that is used as a lubricating means. This water can be obtained by allowing the holes 112 to be connected to the crankcase 98, so that the exhaust steam can enter the crankcase and then leave the motor through an opening made in the crankcase. Thus, condensed water is obtained in the crankcase. The O-ring 129 can then be eliminated. The development of newer materials and techniques within the plastic field will probably, in a near future, allow even a greater use of plastics with good effects.

It is even possible to arrange, in an uncomplicated way, for a regular forced lubrication system known from the modern four-cycle engines. In such an engine, the lubricant is pumped by an oil pump, driven by the engine. The oil is sucked from the sump and is forced to the crankshaft bearings and from there through bores in the crankshaft to the big-end bearings. Sometimes also the gudgeon pin bearings are lubricated through bores in the connecting rods. From the bearings, the oil splashes and lubricates the pistons.

In the present case with plastic bearings and water as lubricant, it is possible to do without a pump by taking water from the bottom of the steam generator and supplying it to the steam engine after an intermediate proper cooling of the water. Thus, it is possible to have the water supply tube helical and air cooled, e.g. through placing it in the air intake of the heater.

Through such a forced lubrication system, the load on the bearings can be considerably increased.

Figure 7:
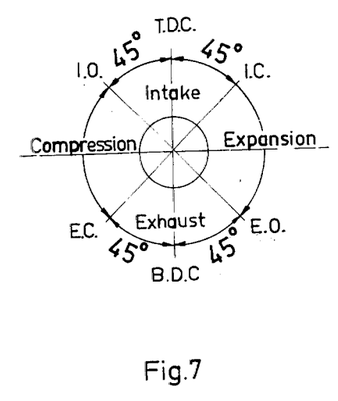
FIGS. 7 and 8 are two diagrams of the operation of the same steam engine.
Figure 8:
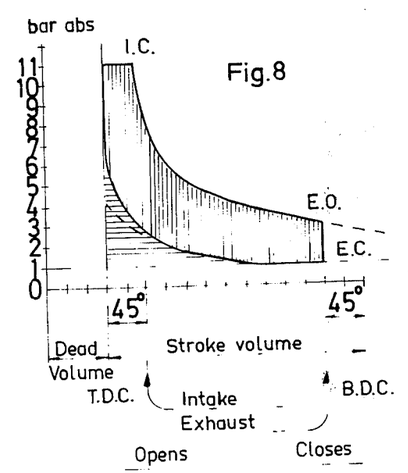

The function of the steam engine can be studied on FIG. 5 and also on FIGS. 7 and 8.

FIG. 7 is a diagram, showing the angles of the crankshaft 100 at which the steam intake is opened and closed (I.O. and I.C. respectively) and at which the steam exhaust is opened and closed (E.O. and E.C. respectively). The angles have here all been stated at 45°, but other angles, both larger and smaller, may be more suitable dependant on the existing conditions. It is also of course not necessary that the intake and exhaust angles are alike.

FIG. 8 is an indicator diagram, in which the area shaded through vertical lines is the effective working area.

In the position of the piston 108 in FIG. 5, the passage for the supply steam to the upper side of the piston is free. The steam enters through the tube 118 and passes through the space between the cylinder casing 116 and the cylinder part 97 and further through the holes 111 and 110. The corresponding position in FIGS. 7 and 9 is marked T.D.C (Top dead centre). The engine is capable of running in both directions, but here it is chosen to show the rotation clockwise according to FIG. 5. The piston 108 is moving downwards and the steam pressure above the piston is constantly equal to that of the supplied steam. At the point marked I.C. in FIGS. 7 and 8, the steam supply is shut off since the holes 110 of the piston 108 are not covered by any part of the holes 111 of the lining 99. The crankshaft 100 is rotated further clockwise, and the piston moves further downwards, the enclosed steam quantity being expanded. At the point which in FIGS. 7 and 8 is marked E.O., the holes 110 of the tubular protrusion 109 of the piston 108 is moving in over the holes 112 of the lining 99. The steam pressure thereby expands down to about the outer air pressure. At the point which in FIGS. 7 and 8 is marked E.C., the exhaust openings are closed again At a further rotation of the crankshaft 100, the enclosed remaining steam is compressed more and more until a point is reached which in FIGS. 7 and 8 is marked I.O. At this point, steam is again supplied to the cylinder part. At a further rotation of the crankshaft 100, the piston will arrive at the position shown in FIG.

5, and a working cycle is completed.

The steam engine is unique in several respects. So for example it has, contrary to other machines of that kind, a compression stroke, which is a sacrifice to the simplicity. If this compression stroke was not included, it should be able to get a larger effect from the engine; i.e. an increase of the working area which corresponds to the area, which in FIG. 8 is shaded with horizontal lines. The compression stroke does not affect the degree of efficiency to any noticeable extent.

For an idea of the dimensions of the steam engine it can be mentioned that for a car heater having a fan motor with ordinary rotational speeds and effects, it will require an output power of the steam engine of about 100 W in order to have a charging effect of 35 W. With a steam pressure of 10 bar and a superheating to 250° C, a cylinder volume of 2.5 cm$^3$ is required, which means a cylinder diameter and a piston stroke of 16 mm. The steam engine in FIGS. 5 and 6 (as presented in the application) is drawn in the scale 1:1 with substantially these dimensions.

With the powers and the steam condition mentioned in the preceeding paragraph, a steam effect of about 1000 W will pass the steam motor and of these about 100 W is converted into mechanic energy. The remaining 900 W is returned to the water with the exhaust steam.

Figure 4:
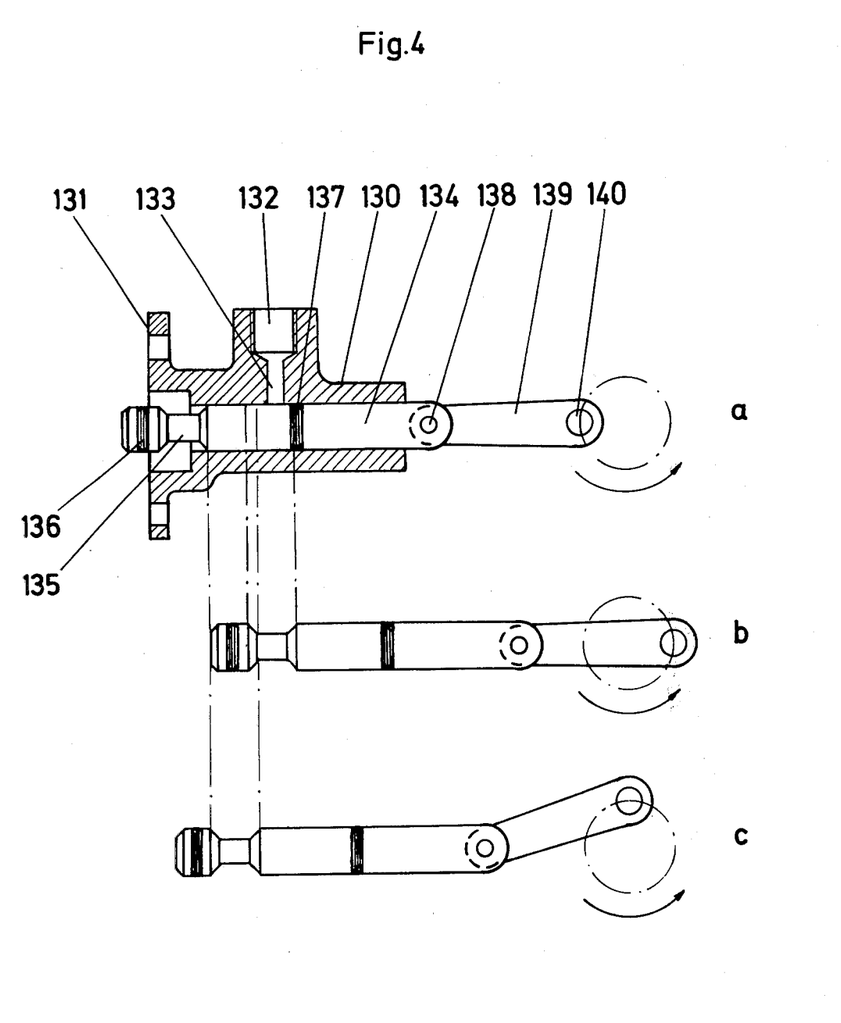
FIG. 4 is a longitudinal section of a feed pump included in the inventive device.

In connection with FIG. 4 as here below described, the water level controlling feed pump 57, which has been mentioned before in connection with FIG. 3, is an essential contributory case to the simplicity of the whole system. If an ordinary pump type had been used, it would have required a special control system, containing for instance a float in the steam generator, which float through an electric, mechanic or in any other way driven servo system should have controlled the start and stop of the pump or in any other way varied its capacity.

The pump consists of a housing 130 having a connection flange 131 facing the steam generator and further with a water supply opening 132, which is connected to a channel 133 leading to the cylinder bore for a piston 134. This piston is provided with a waist 135 and grooves for two O-rings 136 and 137. The piston 134 is provided with a fork like recess and a hole, in which a piston bolt 138 is mounted. The piston bolt 138 constitutes a pivotal connection between a connecting rod 139 and the piston 134. The other end of the connecting rod 139 is pivotally mounted about a bolt 140 belonging to a crankshaft which is only schematically indicated in FIG. 4. This crankshaft is continuously driven by the steam engine or, by the fan motor if this is self-starting, so that it, as is mentioned before, is via a free wheel connected to the fan motor 1 in FIG. 1.

In order to describe the function of the pump, it is advisable to begin with the position the piston has in FIG. 4b. The waist 135 of the piston 134 is then in connection with the water supply opening 133. By gravity water flows down and fills up the space between the waist 135 and the cylinder bore. The crankshaft is rotated counterclockwise and will arrive at the position according to FIG. 4c. The water quantity enclosed by the waist 135 is then entirely cut off from the connection with the water supply opening 133 and has also no connection with the steam generator. When the piston 134 at a further rotation of the crankshaft in counterclockwise direction, it is moved further to the left. The wasit 135 will be connected to the steam generator. In FIG. 4a, this connection is entirely completed.

If the water level in the steam generator is below the lower edge of the cylinder bore, then the whole water quantity enclosed between the waist 135 and the cylinder bore will be supplied to the steam generator. If, however, the water level is above the upper edge of the cylinder bore, no water will be supplied to the steam generator. If the water level is anywhere between the upper and lower edges of the cylinder bore, a part of the water quantity, enclosed between the waist and the cylinder bore, for instance half of this quantity, if the water level in the steam generator corresponds to the centre line of the cylinder bore — piston.

Figure 13:
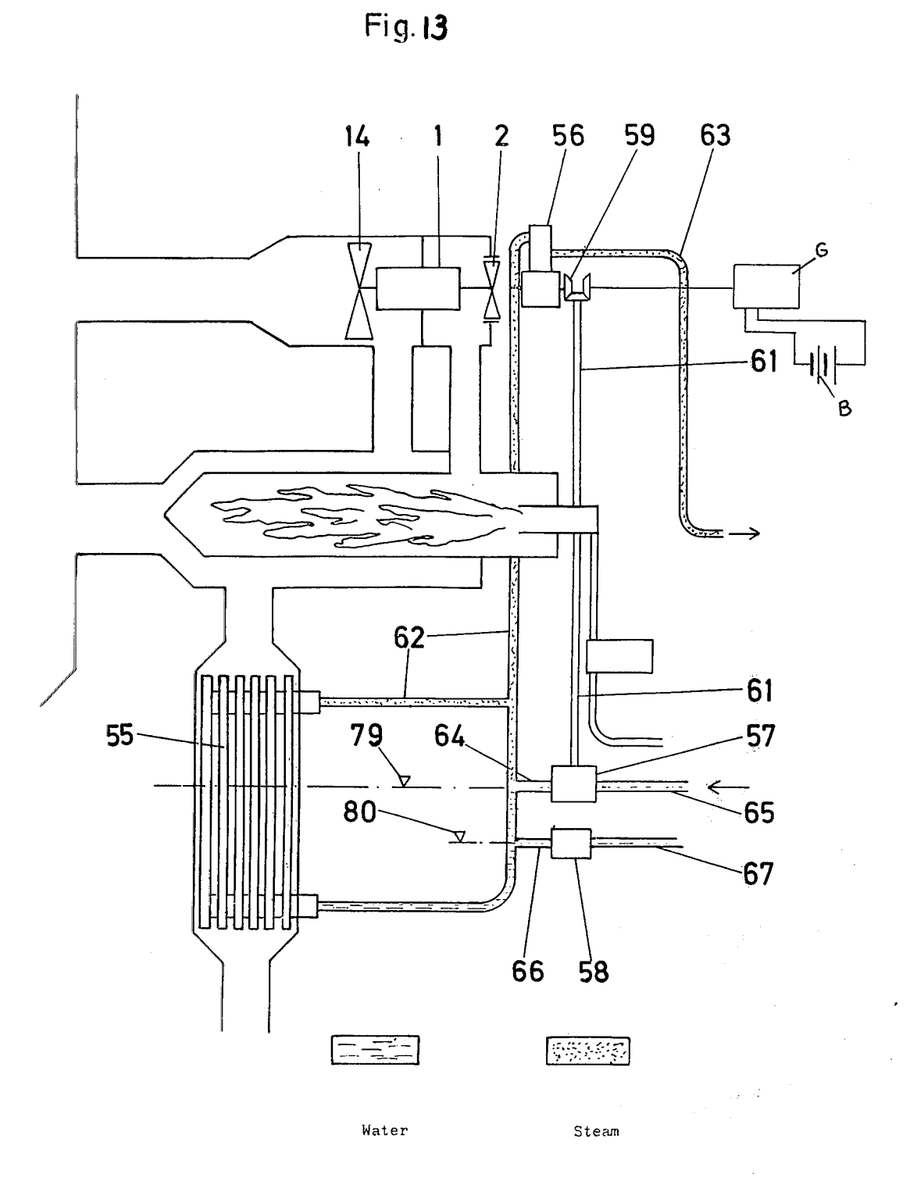

FIG. 13 shows a modification of the structure of FIG. 3 wherein the steam engine 56 drives a generator G for charging battery B. In this case only the steam engine drives the generator G since there is no shaft between fan motor 1 and the steam engine, as was provided in the embodiment of FIG. 3.

In order to show how small a pump of the type here above described can be made, it can be mentioned that a steam engine having a shaft effect of 100 W at a pressure of 10 bar absolute and a superheating to 250° C requires 1.3 litres per hour. If the speed of the pump is reduced to one revolution per second, it needs only deliver ⅓ cm$^3$ per stroke if the liquid density is 1. Taking a certain security margin into account for instance ½ cm$^3$ seems to be proper.

I claim:

1. In an automobile heating system, a heater comprising a burner, an air system means for circulating air from said automobile through said heating system, a water system heated by said burner, means including a battery for supplying any required electric energy to said heater, said heater further including means for removing steam from the water system heated by said burner, which steam is formed at least in part responsive to the heat delivered from the burner to said water, and steam engine means driven by said steam for converting said steam there into mechanic energy, said mechanic energy being utilized to drive apparatus included in the heater, which apparatus normally consume electric current.

2. A car heater according to claim 1 for use in a car with a water system for cooling the engine or for heating the passenger compartment, and means for directing the exhaust steam from the steam engine into a suitable part of this water system.

3. A car heater according to claim 1, and means including an electromotor for operating at least one fan for supplying combustion air to the heater and for circulating heated air to the passenger compartment of the car, means for coupling the steam engine to the shaft of the electromotor, whereby the steam engine drives the shaft at such a high rotational speed, that its counter electromotive force is equal to or exceeds the battery voltage.

4. A car heater according to claim 1 and means whereby the steam engine only operates a generator for charging the battery.

5. A car heater according to claim 1 and a steam generator for supplying steam to the steam engine, means for supplying the generator with water by means of a feed pump, and a relief valve for the steam generator, said relief valve being placed on a level which is below the maximum water level of the steam generator caused by the supply of the feed pump, whereby when the relief valve is opened, in the beginning, it is only releasing water, and, when the water level of the steam generator has been lowered to the level of the relief valve, steam is blowen off.

6. A car heater according to claim 1, wherein said steam engine includes a piston, and control means for the steam engine, said control means comprising three series of holes and a tubular, upper protrusion extending from the steam engine piston, one of said series of holes being formed in the protrusion mentioned and the two other series of holes being formed in the cylinder walls of the motor, and means whereby the holes of the protrusion on the upper side of the piston are alternatively connected to the two other series of holes to enable the supply thereto of steam or the exhaust of steam therefrom.

7. A car heater according to claim 6, characterized therein, that the steam engine has an intake stroke, an expansion stroke, an exhaust stroke, and a compressive stroke.

8. A car heater according to claim 1, characterized therein, that the bearings required for the steam motor is made of a plastic material.

9. A car heater according to claim 8, characterized therein, that condensed water is used as lubricating means for the plastic bearings.

10. A car heater according to claim 8, characterized therein, that a forced lubricating system is used for supplying water to the plastic bearings, which water is taken from the bottom of the steam generator and is cooled before being delivered to the bearings.

11. A car heater according to claim 10, characterized therein, that the water is fed from the steam generator to the bearings through a helical supply tube placed in the air intake for the heater.

12. A car heater according to claim 1, characterized therein, that the cylinder of the steam engine is provided with a plastic lining, the thickness of which is such that the play between the piston of the steam motor and the cylinder lining is unchanged upon variations of the temperature.

13. A car heater according to claim 1, for use in a car which is provided with a heat exchanger which uses circulating water for heating the passenger compartment and steam generator means in the form of a heat exchanger which has a large heat transferring surface, means for taking heat from the exhaust gases from the heater burner and using it for the generation of steam, means for supplying the steam to the steam engine, and means for passing the remaining heat through said generator heat exchanger and further through a relief valve connected to the passenger compartment heat exchanger.

14. A car heater according to claim 1, and a steam generator means for supplying steam to the steam engine, and feed pump means for supplying the water to the steam generator, said feed pump comprising a cylinder and a horizontally positioned piston running in said cylinder, means for supplying said piston with a water supply from above and with a waist formed therein for receiving a certain quantity of the supplied water, which during the movement of the piston is fed laterally into the water of the steam generator.

* * * * *

UNITED STATES PATENT AND TRADEMARK OFFICE
CERTIFICATE OF CORRECTION

PATENT NO. : 3,942,719
DATED : March 9, 1976
INVENTOR(S) : Folke Ivar Blomberg

It is certified that error appears in the above-identified patent and that said Letters Patent are hereby corrected as shown below:

Col. 2, line 56, delete "to";

Col. 9, line 41, delete "of" and insert --having a--;

Col. 13, line 31, change "case" to --cause--.

Signed and Sealed this

Sixth Day of July 1976

[SEAL]

Attest:

RUTH C. MASON
Attesting Officer

C. MARSHALL DANN
Commissioner of Patents and Trademarks